May 9, 1950        M. ROSENFELD        2,507,223
EDUCATIONAL DEVICE
Filed March 25, 1947        3 Sheets-Sheet 1
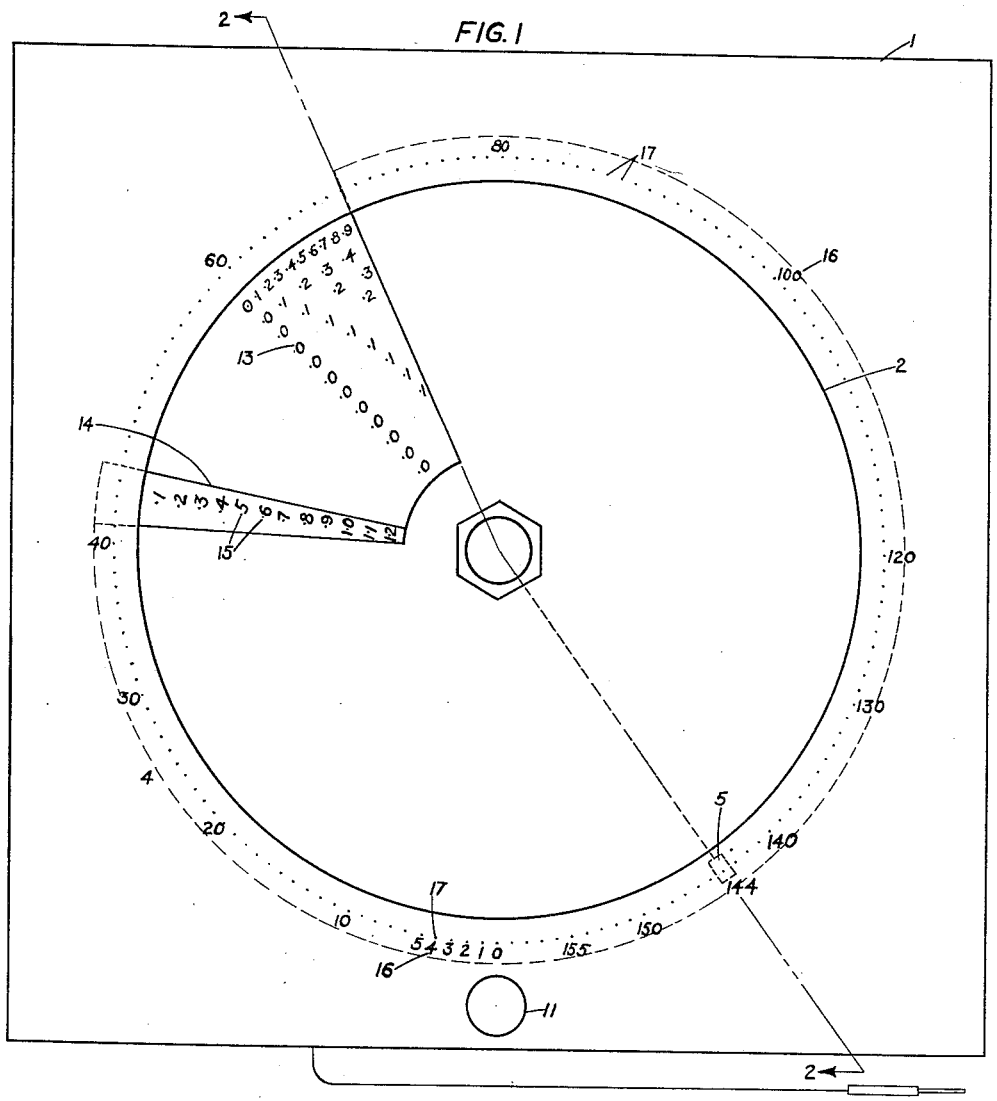
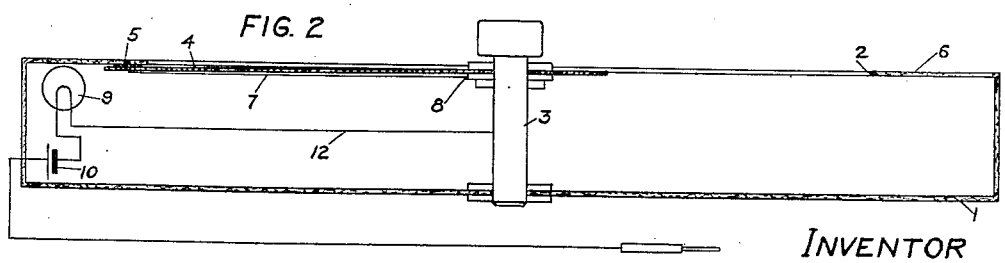
INVENTOR
Myer Rosenfeld
By Watson, Cole, Grindle & Watson
ATTORNEYS May 9, 1950  M. ROSENFELD  2,507,223
EDUCATIONAL DEVICE
Filed March 25, 1947  3 Sheets-Sheet 2
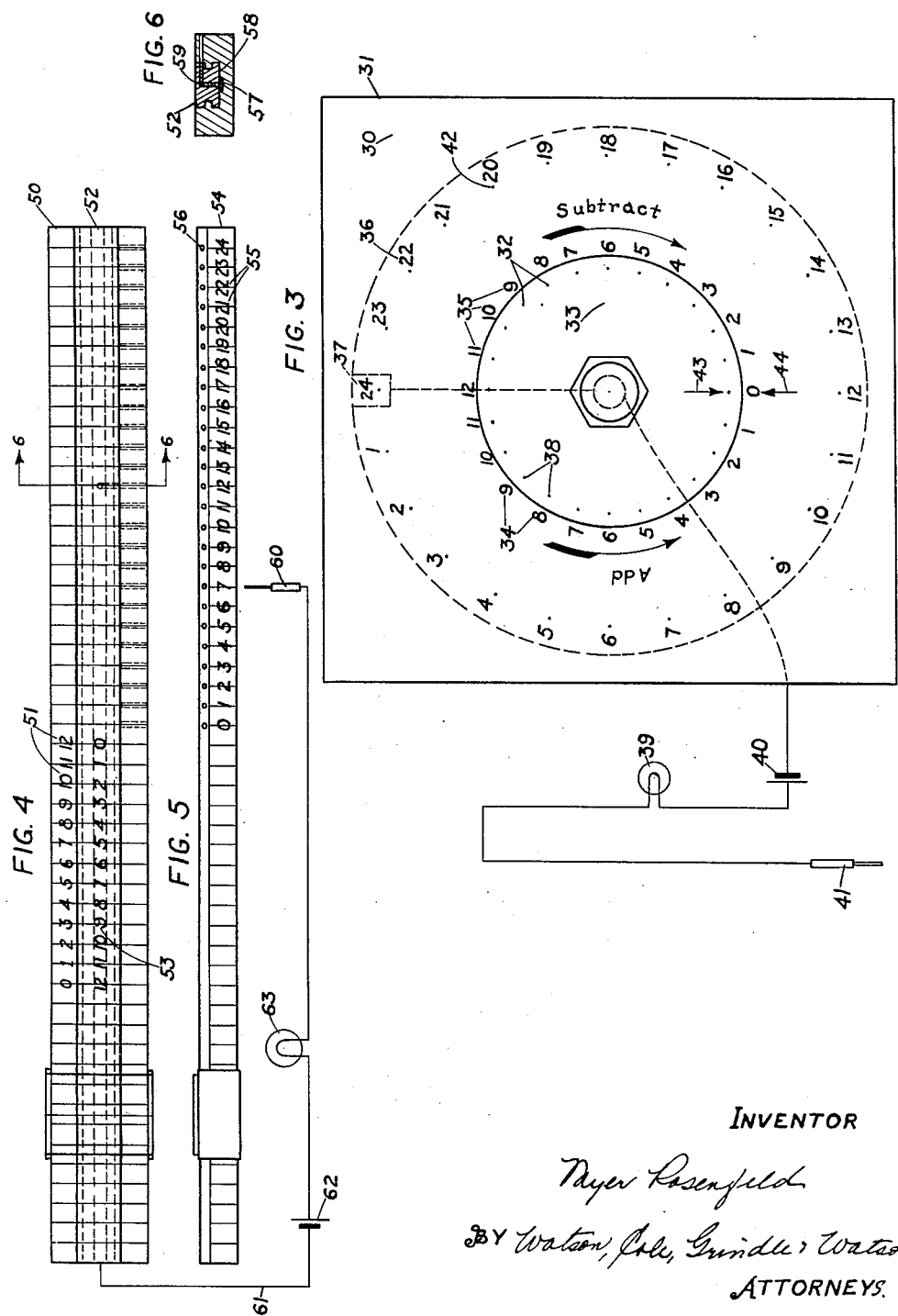
INVENTOR
Mayer Rosenfeld
BY Watson, Cole, Grindle & Watson
ATTORNEYS.

May 9, 1950
M. ROSENFELD
2,507,223
EDUCATIONAL DEVICE
Filed March 25, 1947
3 Sheets-Sheet 3
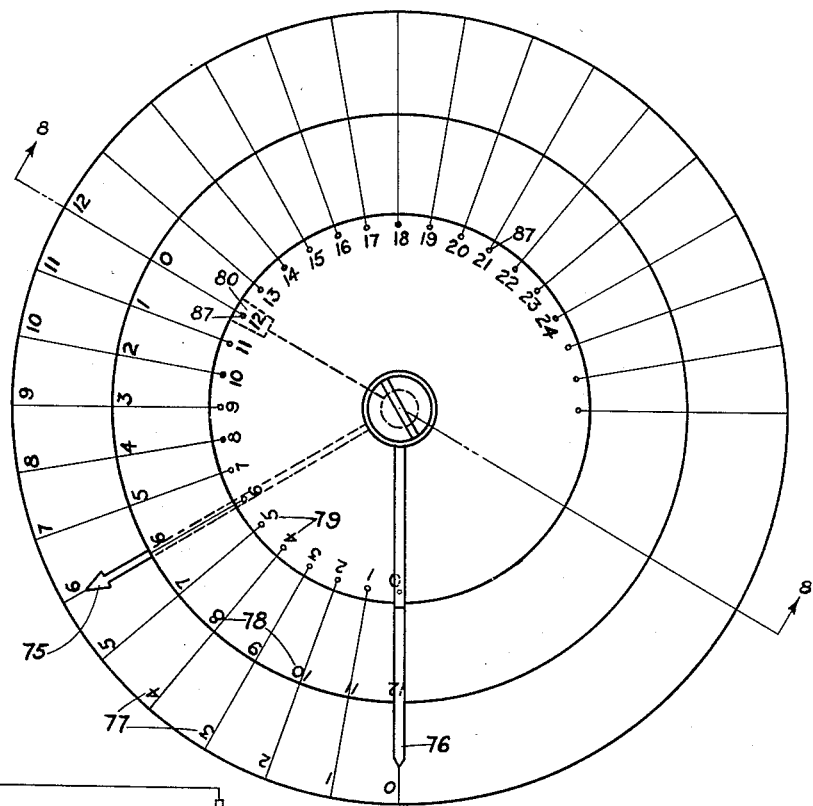
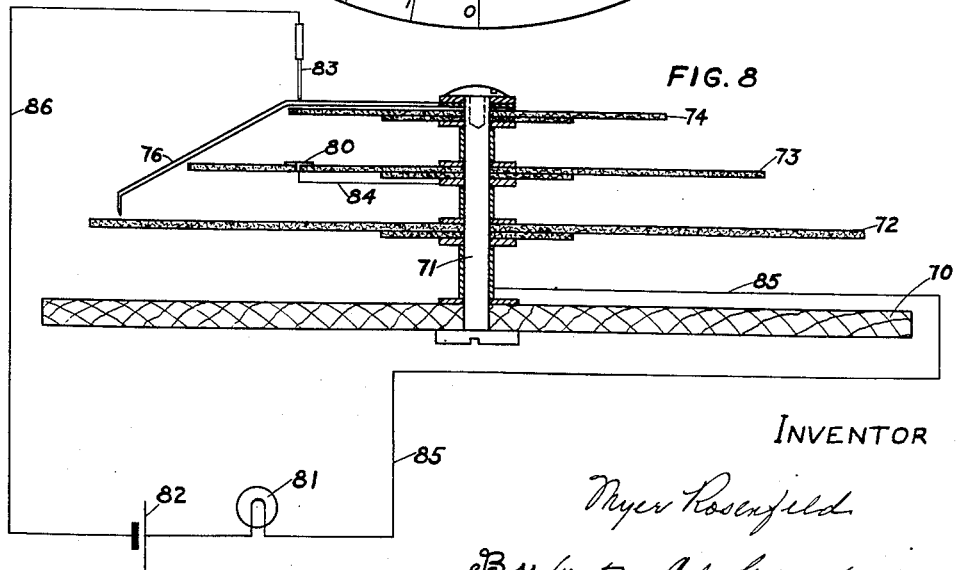
INVENTOR
Myer Rosenfeld
By Watson, Cole, Grindle & Watson,
ATTORNEYS

Patented May 9, 1950

2,507,223

UNITED STATES PATENT OFFICE 2,507,223

EDUCATIONAL DEVICE

Myer Rosenfeld, Aberdeen, Md.

Application March 25, 1947, Serial No. 736,914

11 Claims. (Cl. 35—31)

This invention relates to educational devices and more particularly to devices of the type adapted for teaching mathematics to children.

Since the device is adapted primarily for teaching mathematics to small children, it is essential that it have, in the operation thereof, an element of interest and entertainment that will hold a child's attention and concentration in much the same manner as a game for longer periods and more thoroughly than apparatus formerly provided for that purpose. It is also desirable in devices of this type, to provide a plurality of moving parts so that it is necessary for the child to perform various mechanical operations while using the educational device, thus requiring coordination of the mind and hands, which is always helpful in teaching. An element of award is also very helpful in any educational device adapted for teaching small children, since it adds to the interest in using the device and gives to the child a feeling of satisfaction when a problem is correctly solved.

These advantages over apparatus formerly provided for teaching mathematics to children are obtained by forming the educational device as nearly as possible as a game of the question and answer variety where the questions themselves are formed or set up by the child and then the answer guessed.

The apparatus has the further features of being simple to operate, inexpensive to manufacture and durable, all of which features improve any device designed for use by children. Other advantages of the present invention will become more apparent from the following description in the course of which reference is had to the drawings in which:

Figure 1 is a top plan view of an educational device for teaching simple problems in multiplication;

Figure 2 is a cross-sectional view of Figure 1 taken along line 2—2;

Figure 3 is another form of my invention adapted for teaching simple problems in addition and subtraction;

Figure 4 is still another modification of my invention for teaching addition;

Figure 5 is a side view of the device shown in Figure 4;

Figure 6 is a cross-sectional view taken along line 6—6 of Figure 4;

Figure 7 is a top plan view of yet a different form of my invention; and

Figure 8 is a cross-sectional view of the device shown in Figure 7.

According to the present invention, various forms of which are shown in the drawings, the educational device comprises in main, relatively movable members each having a set of symbols thereon, the individual symbols of each set being adapted to be brought into alignment with individual symbols of the other set to form a plurality of problems, the problems formed depending on the way the symbols are spaced on the movable members. A set of answers to the problems formed is provided on one of the movable members while a hidden indicator, of electric conducting material, is secured to the other member so as to move with the same.

The symbols in the various sets are spaced an equal distance, either linear or angular, or multiples of this distance from each other. The indicator, therefore, must always move over a distance corresponding to some multiple of the distance between any two symbols in the set, the distance moved by the indicator depending on the relative movement of the members. The indicator, therefore, will always come to rest near the correct answer.

The indicator is part of an electric circuit comprising a source of electric energy, an electric signal, and an electric probe which, when inserted through an aperture near the correct answer, will contact the hidden indicator closing the circuit therethrough and causing the signal to be energized to indicate that the correct answer has been selected.

Referring more particularly to the drawings, Figures 1 and 2 illustrate one form of my invention adapted for teaching multiplication. The multiplication instruction device comprises a box-like casing 1 with a circular opening 2 formed in the top thereof. A support 3 is secured to the bottom of the casing 1 and carries a rotatably mounted disc 4. The diameter of the disc 4 is slightly greater than the diameter of the opening 2 and is positioned below the opening so that the outer edge of the disc is hidden by the top 6 of the casing 1. A flat contact plate or indicator 5 is carried near the edge of the disc 4 on the portion of the disc which is concealed under the top 6 of casing 1. This indicator 5 is electrically connected to the support 3 through a conductor 7 and conducting ring 8. An electric lamp 9 and battery 10 are concealed in the casing 1 and are electrically connected through a conductor 12 to the support 3. The lamp 9 is positioned under an opening 11 in the top 6, the opening 11 being covered by any suitable transparent material.

The bottom wall of the casing 1 has a set of numbers 13 radially disposed thereon, the set consisting of a plurality of groups of numbers, the numbers in each group reading from 0 to 12 and starting on the same radial line. These groups are spaced at different distances from the center, the spacing of the individual numbers in the respective groups varying. In the outermost group each of the numbers 1 to 12 are spaced a single unit apart; in the second outermost group each of the numbers 1 to 12 are spaced two units apart, the spacing between the numbers in the separate groups thus progressively increases towards the center of the disc where, in the final or twelfth group, the numbers are spaced twelve units apart.

The disc 4 is provided with a cut-away portion 14 through which the numbers 13 can be viewed, a set of numbers 15 running from 1 to 12 is carried on the edge of the cut away portion of the disc 4 and the individual numbers are so positioned as to be aligned with the respective groups of numbers in set 13. A set of answer numbers 16 are marked around the edge of the circular opening 2 on the top of casing 1. These numbers are spaced one unit apart in the same manner as the outermost group of numbers in set 13 and are provided with small openings 17 adjacent thereto passing through the top of the casing 1 and communicating with the disc 4 below. Thus it can be seen that when any of the numbers in set 15 carried by the disc 4 are aligned with a selected number of set 13 the disc 4 and the indicator 5 will be moved through a predetermined number of units, depending upon the numbers selected. For example, if numeral 12 of list 15 is aligned with numeral 12 on the innermost group of numbers in set 13 the indicator 5 will be moved through 144 units coming to rest under the aperture adjacent the numeral 144 in the set of answer figures 16 as shown in Figure 1. If the correct answer is now guessed and the probe 18, which is electrically connected to battery 19 and lamp 9, is inserted through the aperture adjacent number 144 an electric circuit is completed through lamp 9 and battery 10, the lamp 9 will therefore light showing that the correct answer has been guessed.

An apparatus, designed in accordance with my invention, adapted for teaching addition and subtraction is illustrated in Figure 3. The apparatus itself, structurally, is very similar to that used for multiplying, illustrated in Figures 1 and 2 described above, the main difference being in the placing of the figures used for setting up and working various problems. The top 30 of casing 31 has a central circular opening 32 similar to that in Figure 1; however somewhat smaller in diameter. A disc 33 is rotatably supported under the top 30 in a manner similar to that described in the multiplication device. On the top 30 adjacent the edge of the opening 32 are placed two sets of numerals 34 and 35, each set consisting of numbers running from 0 to 12, the numbers in set 34 increasing in a clockwise direction while the numbers in set 35 increase in a counterclockwise direction. Another set of numerals 36 having the same angular spacing therebetween as the numerals in sets 34 and 35 is also placed around opening 32 on a circle of larger diameter than sets 34 and 35. The numerals in set 36 are numbered from 1 to 24, increasing in a counterclockwise direction and comprise the answers to any problems set up on the apparatus. The disc 33 is sufficiently large so that its outer edge extends well beneath the set of answer numerals 36 and carries a conducting indicator 37 which is adapted to move beneath the answer figures. A set of markings or apertures 38 are carried on the exposed portion of the disc 33, these markings having the same angular spacing as the figures in the various sets.

An electric lamp 39, battery 40 and probe 41 are electrically connected to indicator 37 in a manner similar to that already described. Openings 42 are located in top 30 adjacent each of the answer figures in set 36. The disc 33 has an arrow 43 adapted to be aligned with an arrow 44 carried by cover 30, the arrow 44 marking the zero numeral of sets 34 and 35, the aligning of the arrows marks the zero or starting setting of the device. If it is desired to add two numbers such as 3 and 4, the arrows 43 and 44 are first brought into alignment, then the marking on disc 33 opposite numeral 3 in set 34 is moved opposite arrow 44, the marking on disc 33 opposite numeral 4 of set 34 is next moved opposite arrow 44. It will be observed that indicator 37 has been moved through 3 plus 4 equal angular steps and has, therefore, come to rest under number 7 in the answer set of numerals 36. If, now, the correct answer 7 is guessed and the electric probe 41 is inserted through the opening 42, adjacent the number 7, it will contact indicator 37, completing the circuit through lamp 39 and indicating that the correct answer has been guessed. It is apparent that if any other answer than the correct answer were selected, the circuit would not be completed and lamp 39 would not light.

If it is desired to form a problem in subtraction, such for example as subtracting 3 from 7, disc 33 is first rotated so that indicator arrow 43 is in line with the numeral 7 of set 35. The disc 33 is then rotated in a counterclockwise direction until the indicator, of group 38, adjacent the numeral 3 in set 35, is moved to a position in front of indicating arrow 44 on top 30. It is apparent that this will bring the hidden conducting indicator 37 beneath the numeral 4 in answer set 36.

The modification shown in Figures 4, 5 and 6 illustrate an apparatus for teaching addition, the apparatus being in the form of a straight slide rule. Referring to Figures 4, 5 and 6 of the drawings, 50 is a rectangle rule carrying a set of equally spaced numerals 51 marked thereon. A slide 52 is adapted to be carried by member 50 in a manner similar to the conventional slide rule, and has marked thereon a set of numerals 53, having the same spacing as numerals in set 51, but increasing in the reverse order. On the edge 54 of member 50 is a set of numerals 55 having the same spacing therebetween as the numerals in sets 51 and 53, the numerals in set 55 comprising the answers to any addition problem formed with the numerals in sets 51 and 53. Each of the numerals in set 55 has an opening 56 adjacent thereto and passing through rule 50 into communication with the slide 52. A flat conducting plate 57 is positioned in the bottom of a cut-away portion 58 of member 50 in which slide 52 is adapted to move. Slide 52 is provided with an angular conducting indicator 59 shaped so as to contact plate 57 and to be aligned with any of the openings 56.

The rule is used as follows: If it is desired to add 3 and 4, slide 52 is first moved to bring numeral 4 in set 53 into alignment with numeral 3 in set 51. If now, the right answer, 7, is guessed and the probe 60 is inserted through the opening adjacent number 7 is answer set 55, an electric circuit will be completed through indicator 59, plate 57, conductor 61, battery 62, and lamp 63, the lamp is thus lighted and signals that the correct answer has been selected. It is obvious that if it were desired to make an apparatus adapted for working problems in subtraction in the form of a rule, it would only be necessary to reverse the order of the numerals in set 53 so that they increased in the same direction as the numerals in set 51.

A further modification of an educational apparatus adapted for teaching addition is illustrated in Figures 7 and 8 in which 70 is a base member formed of any suitable insulating material. A shaft support 71 is mounted on base 70 and carries discs 72, 73 and 74 and indicators 75 and 76, all of which are mounted so as to be freely movable with respect to each other. Disc 72 has a set of numerals 77 running from 0 to 12, marked on the edge thereof, the individual numerals of which are equally spaced from each other and progressively increase in a clockwise direction. Disc 73 carries a set of numerals 78, comprising the same numbers and which have the same angular spacing as the numerals carried by disc 72 but which increase in the opposite direction. Disc 74 carries a set of answer numerals 79 which have the same angular spacings therebetween as the numerals in sets 77 and 78 and increase in the same direction as the numerals in set 77. The disc 73 also carries a conducting indicator plate 80 which is so positioned as to be concealed by the upper disc 74 and so that it will be under the answer numerals in set 79. The conducting indicator 80 is electrically connected to lamp 81, battery 82 and electric probe 83 through conductor 84, shaft 71 and conductors 85 and 86.

If it is desired to solve a problem or to set up a problem in addition involving the numbers 6 and 6, indicator 76 is first moved so as to be aligned with the numeral zero on disc 72. Disc 74 is then rotated until the zero of answer numerals 79, is also aligned with indicator 76. Indicator 75 is then moved until it is in alignment with numeral 6 on disc 72. Disc 73 is then rotated until numeral 6 of set 78 comes into alignment with indicator 75. Since all of the numerals in the various sets have equal angular spacings, the hidden indicator 80 will be moved through 12 equal angular units and come to rest under the number 12 in answer set 79. If, therefore, the correct answer 12 is now selected and the probe 83 is inserted through opening 87 adjacent numeral 12, it will contact conducting indicator 80 and close the electric circuit through lamp 81. The lamp 81 will, therefore, light, thus signaling that the correct answer has been selected. One of the advantages of the apparatus described in Figures 7 and 8 is that all of the parts being movable, more ingenuity is required to set up the problems than in the other types of educational apparatus described.

It will be apparent that in each of the types of apparatus described it is necessary that the correct answer be selected before the electric circuit through the lamp is completed. Thus, an element of interest and reward is brought into the device for any child who is using the same. It is also pointed out that with the various devices described, a plurality of answers can be obtained with a simple electric circuit, thus requiring a minimum of wiring. It is obvious that various indicators other than a lamp and various other elements may be used without departing from the scope of the invention.

It is also obvious that various other problems or questions can be formed by the use of my invention by substituting names, figures or geometrical forms in place of the numerals marked on the various parts or by having the numerals designate various names or items which can be listed on a key card. For example, robins could have the numeral 1; sparrows the numeral 2, etc. The apparatus, therefore, easily adapts itself to the playing of various games as well as to teaching simple problems in mathematics.

Having thus described the invention, what is claimed as new and desired to be secured by Letters Patent is:

1. In a device of the class described a stationary member having a top portion and a bottom portion, a member mounted for relative movement with said stationary member and having a part thereof hidden by said top portion of said stationary member, a plurality of individual symbols on said bottom portion of said stationary member, a plurality of individual symbols on said movable member, the arrangement of said symbols being such that each symbol of one member may be paired with a selected symbol of the second member to set up a problem to be solved, a plurality of symbols on the top portion of said stationary member each of which indicates the answer to a problem set up by the pairing of a symbol on said movable member with a symbol on the bottom portion of said stationary member, and a hidden indicator carried by said movable member on the part thereof hidden by the top of said stationary member, said hidden indicator movable to a position adjacent the answer symbol which correctly indicates the answer to the problem set up and means for finding said hidden indicator when the correct answer is selected.

2. In a device of the class described a stationary member comprising a container with a top and a bottom, a disc mounted for rotation between said top and bottom and having the outer edge thereof concealed by the top of said container, a plurality of individual symbols having equal angular spacings therebetween on said top disposed around the axis of rotation of said disc, a plurality of individual indicia on said disc on a portion thereof not concealed by said top, said indicia having the same angular spacings therebetween as said symbols, and a mark on said disc and said top said marks positioned to be in alignment with each other when said members are placed in initial starting position, the arrangement being such that a number of indicia may be successively aligned with the mark on said top to set up a problem to be solved, a number of symbols on said top disposed in a circle around said plurality of symbols each of which indicates the answer to a problem set up and a plurality of apertures passing through said top, one aperture adjacent each of said answer symbols and a hidden indicator movable with said disc to a position adjacent one of the answer symbols which correctly indicates the answer to the problem set up and means for finding said hidden indicator comprising an electric circuit in which is included the hidden indicator, an electric signal and an electric probe, said electric probe adapted to be inserted through the aperture adjacent the correct answer to contact the hidden indicator and complete the circuit through said signal to energize the same.

3. In a device of the class described a support, a plurality of superimposed discs mounted thereon for relative movement, two of said discs each having thereon a plurality of individual symbols and the arrangement being such that each symbol on the first of said discs may be paired with a selected symbol on the second of said discs to set up a problem to be solved, a plurality of symbols carried by a third one of said discs each of which indicates the answer to a problem set up by the pairing of a symbol on the first disc with a symbol on the second disc, a plurality of apertures passing through said third disc, one each of said apertures adjacent one each of said symbols and an indicator movable with one of the first two discs and concealed by at least one of said plurality of discs, to a position under one of the answer symbols which correctly indicates the answer to the problem set up, and means for finding said indicator comprising an electric circuit in which is included the indicator, an electric signal and an electric probe said probe adapted to be inserted through the aperture adjacent the correct answer to contact the hidden indicator and complete the circuit through said signal to energize the same.

4. In a device of the class described, in combination, a first member having thereon a series of symbols each indicating a possible answer to a problem, a first element adapted to be manually moved at will into proximity to any selected answer symbol to indicate the operator's solution of a problem set up, a series of spaced problem indicia on a part of the device which has a definite position with respect to said first member, a second member carrying a series of spaced indices, said second member being optionally movable to a plurality of selective positions with respect to said first member wherein a selected problem index on the second member is brought into proximity to a selected problem index on said part for setting up a problem, a predetermined portion of said second member always coming to rest in proximity to that symbol on said first member which corresponds to the answer to the problem, a second element which when engaged by said first element indicates that the operator has correctly solved a problem presented, said second element being fixedly carried upon said portion of said second member, said first means concealing said second element from view and incorporating plural access means for said first element aligned with each answer symbol, whereby said first element may be brought into engagement with said second element when the first element is entered through the access means corresponding to the correct answer symbol.

5. The device as set forth in claim 4 in which an electric signal circuit is provided for indicating the successful selection of the correct answer by the operator, said circuit including a source of current and a signal, and also including as contact making and breaking elements said first element and said second element, said first element being a manually moved electric probe.

6. The device as set forth in claim 4 in which said first member and said second member are both rectangular members mounted for relative movement, each member having thereon a plurality of individual symbols, and the arrangement being such that each symbol of one member may be paired with a selected symbol of the second member to set up a problem to be solved.

7. The device as set forth in claim 6 in which there is provided a conducting strip carried by one of said members, said second element adapted to be in continuous contact with said conducting strip movable with the other of said members to a position adjacent one of the answer symbols, apertures adjacent each of said answer symbols for providing access to said second element and means for finding said second element comprising an electric circuit which includes the second element, said conducting strip, an electric signal, and an electric probe, said electric probe adapted to be inserted through the aperture adjacent the correct answer to the problem set up to contact the second element and complete the circuit through said signal to energize the same.

8. In a device of the class described, in combination, a first member having thereon a circular series of symbols each indicating a possible answer to a problem, a first element adapted to be manually moved at will into proximity to any selected answer symbol to indicate the operator's solution of a problem set up, a second member optionally movable to a plurality of selective positions for setting up a problem, a portion of said second member always coming to rest in proximity to that symbol on said first member which corresponds to the answer to the problem, means for rotatably mounting said second member coaxially and concentrically with respect to said circular series of answer symbols, means which when engaged by said first element indicates that the operator has correctly solved a problem presented, said means being fixedly carried upon said portion of said second member, said first member concealing said first-named means from view when it is in proximity to that symbol which indicates the correct answer to a problem while at the same time permitting the first element to be brought into engagement with said second element when the first element is also brought into proximity to the correct answer symbol.

9. The device according to claim 8 in which said first member is stationary and in which there are other symbols on said first member arranged in arcuate series, a plurality of individual indicia on said second and movable member also arranged in an arcuate series, said indicia having the same angular spacing therebetween as the symbols on the first named member, and in which there is a mark on each of said members, said marks positioned to be in alignment with each other when said members are aligned in initial starting position, the arrangement being such that a number of indicia may be successively aligned with the mark on said stationary member to set up a problem to be solved.

10. The device as set forth in claim 8 in which said first member is a disc rotatable on a fixed axis, said second member is another disc rotatable upon the same axis and in which there is provided a third member also comprising a disc coaxially rotatable with the other two discs, the second member and the third member each having thereon a plurality of individual symbols and the arrangement being such that each symbol on the second member may be paired with a selected symbol on the third member to set up a problem to be solved, and means for initially aligning said first member with said other two members.

11. In a device of the class described, in combination, a first member having associated therewith a series of symbols each indicating a possible answer to a problem, a first element adapted to be manually moved at will into proximity to any selected answer symbol to indicate the operator's solution of a problem set up, a second member for setting up a problem, said second member including a disc rotatable about an axis, a second element directly and eccentrically carried by said disc, said second element being adapted to cooperate with said first element in indicating that the operator has correctly solved a problem presented, said first member including a sheet member disposed in a plane above and parallel to said disc and having an aperture through which a portion of the disc may be viewed, the margin of such member adjacent the view aperture overlying and concealing the path of movement of said second element, said disc being apertured and having thereon, adjacent said aperture, indicia to be paired with other indicia in setting up a problem, and a second sheet member disposed below said disc and bearing said other indicia.

MYER ROSENFELD.

REFERENCES CITED

The following references are of record in the file of this patent:

UNITED STATES PATENTS

| Number | Name | Date |
|---|---|---|
| 1,479,992 | Kinney | Jan. 8, 1924 |
| 1,686,105 | Rothenberg | Oct. 2, 1928 |
| 1,728,584 | Wright | Sept. 17, 1929 |
| 1,810,529 | Rice | June 16, 1931 |
| 2,092,577 | Hornung | Sept. 7, 1937 |
| 2,188,723 | Posey | Jan. 30, 1940 |
| 2,198,894 | Werner | Apr. 30, 1940 |
| 2,221,924 | Pickworth | Nov. 19, 1940 |
| 2,422,421 | Kaufman | June 17, 1947 |

FOREIGN PATENTS

| Number | Country | Date |
|---|---|---|
| 45,507 | Austria | Jan. 10, 1911 |